(12) United States Patent
Baldwin

(10) Patent No.: US 7,880,798 B2
(45) Date of Patent: Feb. 1, 2011

(54) APPARATUS AND METHOD FOR OPTICALLY CONVERTING A THREE-DIMENSIONAL OBJECT INTO A TWO-DIMENSIONAL PLANAR IMAGE

(75) Inventor: Leo B. Baldwin, Livermore, CA (US)

(73) Assignee: Electro Scientific Industries, Inc., Portland, OR (US)

( * ) Notice: Subject to any disclaimer, the term of this patent is extended or adjusted under 35 U.S.C. 154(b) by 312 days.

(21) Appl. No.: 12/206,848

(22) Filed: Sep. 9, 2008

(65) Prior Publication Data

US 2010/0060773 A1 Mar. 11, 2010

(51) Int. Cl.
*H04N 5/225* (2006.01)
(52) U.S. Cl. ...................................... 348/335; 348/143
(58) Field of Classification Search ................. 348/335, 348/143, 36; 382/145; 359/436; 355/553, 355/72
See application file for complete search history.

(56) References Cited

U.S. PATENT DOCUMENTS

| | | | |
|---|---|---|---|
| 6,163,366 A | 12/2000 | Okamoto et al. | |
| 6,870,949 B2 | 3/2005 | Baldwin | |
| 6,963,375 B1 * | 11/2005 | Lundberg | 348/335 |
| 2002/0140670 A1 | 10/2002 | Albeck et al. | |
| 2003/0160780 A1 | 8/2003 | Lefebvre et al. | |
| 2005/0041235 A1 * | 2/2005 | Iwanaga | 355/72 |
| 2007/0268470 A1 | 11/2007 | Shibazaki | |

OTHER PUBLICATIONS

Leo Baldwin, Optimising Vision Systems with Specialized Lighting, Photonics Spectra, Jun. 2003 (Laurin Publishing).
Sight-Pipe Borescopes, Dave Jones Machinists, http://www.sight-pipe.com/360view.htm.

* cited by examiner

*Primary Examiner*—Tuan Ho
(74) *Attorney, Agent, or Firm*—Young Basile

(57) ABSTRACT

A device and method for optically converting a three-dimensional object into a two-dimensional planar image includes a camera, a lighting source and a concentric-shaped mirror positioned about a concentric inspection surface of an object to be inspected. A planar image of the object inspection surface about 360 degrees is generated and inspected for defects, marking indicia or other qualities of interest without having to rotate the camera or object.

20 Claims, 4 Drawing Sheets

APPARATUS AND METHOD FOR OPTICALLY CONVERTING A THREE-DIMENSIONAL OBJECT INTO A TWO-DIMENSIONAL PLANAR IMAGE

TECHNICAL FIELD

The present invention generally relates to automated machine vision systems.

BACKGROUND

In automated machine visions systems, difficulty has been experienced in accurately imaging and inspecting three-dimensional objects and surfaces thereon. This in part is due to the use of typical lenses that distort object characteristics or distances on an object the further away they are from the optical axis. This is further complicated when inspecting surfaces which are not perpendicular to the optical axis. A particularly difficult surface to inspect is the circumferential surface of cylindrically-shaped objects. Many prior techniques have required rotation of the camera about the cylindrical object or alternately rotating the object about its own axis of symmetry to expose the entire surface and taking multiple images thereof.

Thus it would be advantageous to provide a device and method that efficiently and accurately images a three-dimensional object surface and provides an accurate two dimensional or planar image of the entire three-dimensional inspection surface about all 360 degrees with respect to the optical axis.

BRIEF SUMMARY

An imaging device for use in optically transforming a surface of a three-dimensional object into a two-dimensional planar image is disclosed. An example of the inventive apparatus includes an image taking device having an optical axis. The device further includes a concentrically-shaped mirror positioned about the optical axis and the three-dimensional object and an illumination source directed toward the mirror. The mirror projects the illumination on the reflective object inspection surface and reflects the image back toward the image taking device. The image taking device converts the imaged three-dimensional inspection surface about 360 degrees to a two-dimensional planar image of the object inspection surface. The two-dimensional planar image can then be inspected for deviations in surface continuity or other surface markers and/or defects.

In one example of the invention, a telecentric field lens is positioned between the illumination source and the mirror providing illumination rays to the mirror that are collimated or substantially parallel to the optical axis.

In another example of the invention, the illumination source is positioned along the optical axis and provides at least one of darkfield illumination or brightfield illumination of the object inspection surface to maximize the contrast in the planar image of certain conditions on the object inspection surface. In another example, the device employs narrow angle darkfield illumination.

In an example application of the inventive device, the object is a three-dimensional, cylindrically-shaped object having a vertical circumferential inspection surface.

A method for optically transforming a three-dimensional object surface into a two-dimensional planar image is disclosed. The method includes providing an image capturing device having an optical axis. The method includes positioning a three-dimensional object along the optical axis. The method further includes positioning a concentrically-shaped mirror about the optical axis and the three-dimensional object. The mirror is illuminated with illumination rays which are projected by the mirror onto the object inspection surface and reflected back toward the image capturing device for conversion to a two-dimensional planar image of the entire inspection surface about 360 degrees.

In one example of the method, a telecentric field lens is positioned along the optical axis and positioned between the source of illumination and the mirror.

In another example of the method, at least one of darkfield or brightfield illumination is used and the reflected image rays are selectively allowed to pass to the image capturing device.

In one application of the inventive method, the object is a three-dimensional cylinder having a vertical inspection surface.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
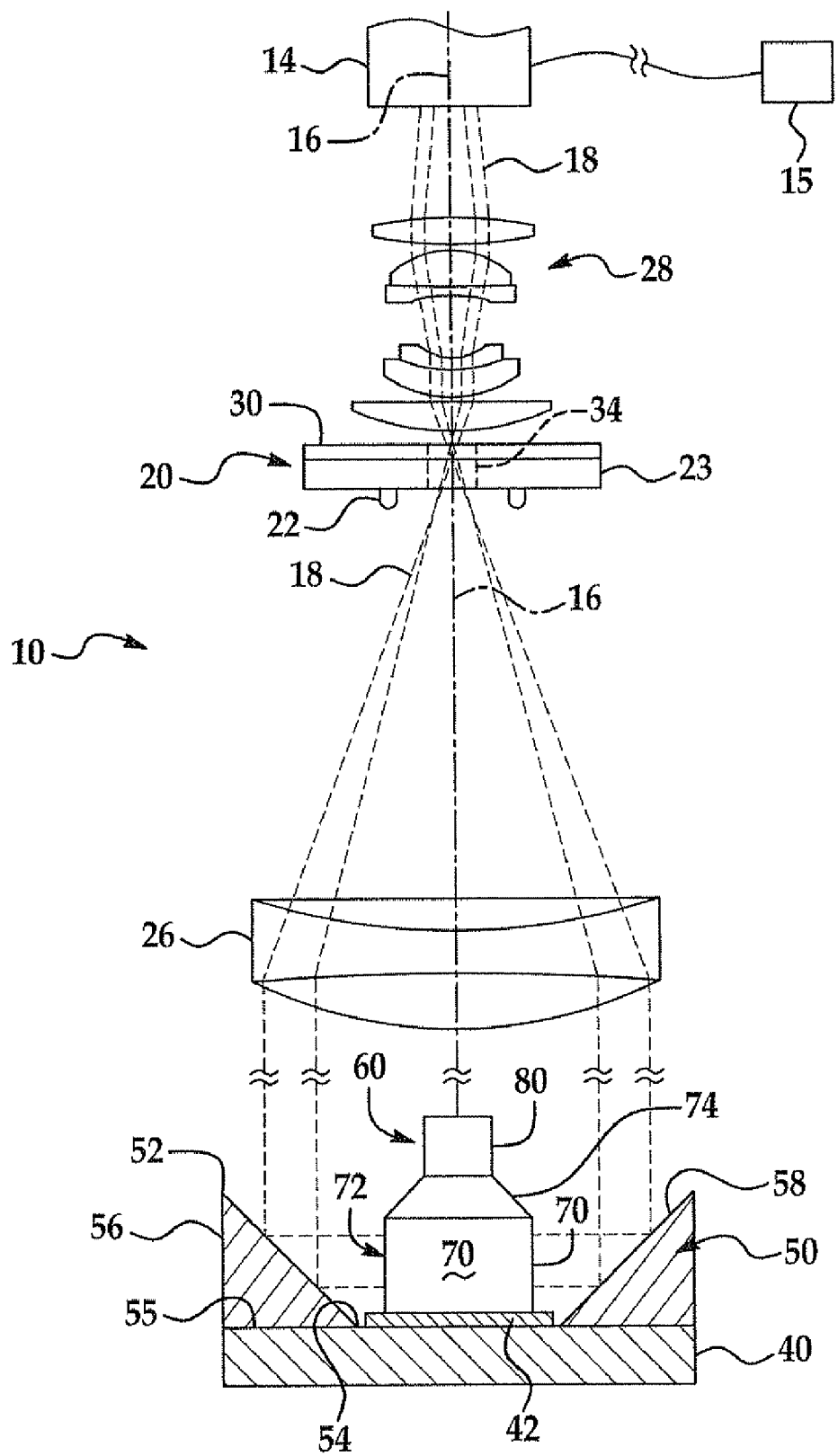
FIG. 1 is a schematic, partial cross-section of an example of the inventive device used with a cylindrical-shaped object and inspection surface, the figure schematically showing the image rays.
Figure 2:
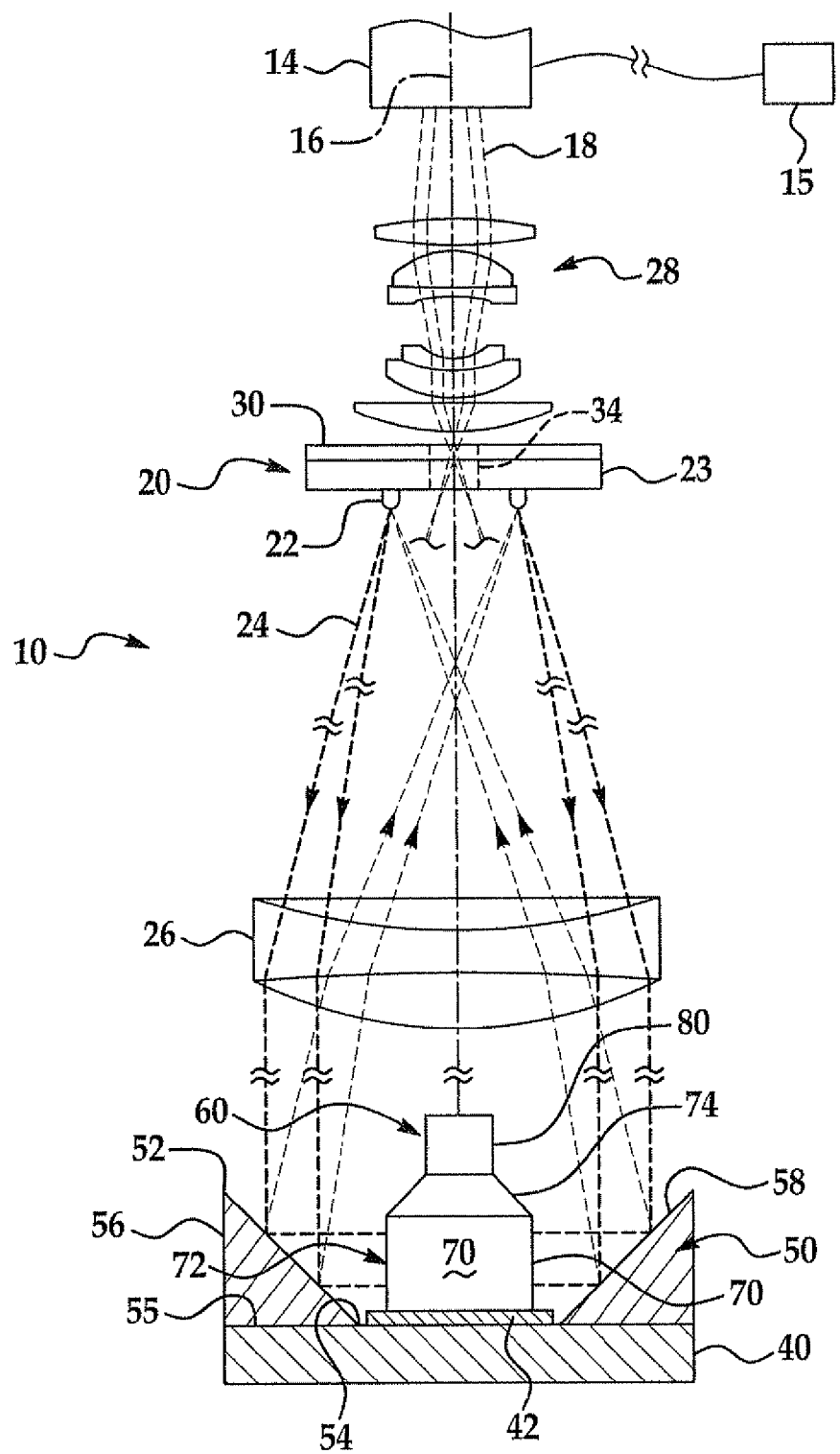
FIG. 2 is a schematic, partial cross-section of an example of the inventive device shown in FIG. 1 showing exemplary illumination rays and partially showing the image rays.

Referring to FIGS. 1 through 4, examples of an apparatus and method of the invention are illustrated. Referring to FIGS. 1 and 2, an optical device 10 is schematically shown including an image taking device 14 having an optical axis 16. Image taking device 14 is preferably a charge-coupled device (CCD) camera in electronic communication with a computer 15 and/or other typical machine vision system components including drivers, frame grabbers, display monitors, software and/or data storage libraries and other components (all not shown) known by those skilled in the art. Image taking device 14 can include devices other than CCD cameras suitable for the particular application known by those skilled in the art. As schematically shown in FIG. 1, image taking device 14 receives image rays 18 in a manner dependent on the optical lenses used which are more fully described below.

An example of optical device 10 in FIGS. 1 and 2 further includes an illumination source 20 positioned along the optical axis 16. Illumination source 20 is preferably a plurality of light emitting diodes (LEDs) 22 positioned in a ring around optical axis 16 mounted to a circuit board 23 which produce cones or rays 24 of light as schematically illustrated. In FIGS. 1 and 2, illumination source 20 is positioned between a telecentric field lens 26 and a rear lens group 28 discussed further below. It is understood that illumination source 20 may be positioned in other positions in optical device 10 along optical axis 16 (not shown) without deviating from the present invention.

In a preferred example, the LEDs 22 are positioned in one or more concentric rings (one shown) about the optical axis and oriented at a small or narrow angle with respect to the optical axis 16 for narrow darkfield-type lighting of the object inspection surface 70 as described below. One example of an optical system producing narrow darkfield illumination may be found in commonly assigned U.S. Pat. No. 6,870,949 which is incorporated herein by reference. Wide angle darkfield illumination may also be used to suit the application without deviating from the invention. Illumination source 20 may also be positioned outside of the optical axis (not shown) and include mirrors or other devices to direct rays 24 where desired for illumination of objects or inspection surfaces.

It is understood that illumination sources other than LEDs, or lights positioned at narrow angles to the optical axis 16 may be used to suit the particular application, desired inspection process or image contrast of the object surface to be inspected. For example, illumination source 20 may be equipped and arranged to produce brightfield illumination of an inspection surface. An explanation of one example of brightfield illumination may be found in commonly assigned U.S. Pat. No. 5,737,122 which is incorporated by reference.

Still referring to FIGS. 1 and 2, an example of optical device 10 further includes a lens 26 positioned along optical axis 16. Lens 26 may further accompany a rear lens group 28 positioned as generally shown in FIGS. 1 and 2 and described in U.S. Pat. No. 6,870,949 which is incorporated by reference. In a preferred example, lens 26 is a telecentric field lens centrally positioned along the optical axis 16 to receive principal light illumination rays 24 from illumination source 20. Telecentric field lens 26 may further include rear lens group 28 and telecentric stop 30 to form a telecentric lens system as generally shown. Preferred telecentric field lens 26 and exemplary rear lens group 28 convert or collimate the oblique principal illumination rays 24 to be substantially parallel with the optical axis 16 following passage through the lens as best seen in FIG. 2. When provided with illumination from illumination source 20 as best seen in FIG. 2, exemplary telecentric field lens 26 and rear lens group 28 operate to form an image at image taking device 14 as best seen in FIG. 1. Although shown as a telecentric lens, mirrors, or other forms or combinations of lenses and/or mirrors may be used to suit the particular application, desired form of illumination and contrast requirements of the resultant image described below.

As described, an example of optical device 10 with exemplary telecentric field lens 26 may further include a telecentric stop 30 positioned adjacent to illumination source 20 circuit board 23. Telecentric stop and circuit board 23 preferably include an aperture 34 which allows image rays 18 and selected illumination rays 24 to pass through circuit board 23 and telecentric stop 30 as described in more detail below. Although shown as separate components, circuit board 23 may be configured to include a suitable aperture 34 and a separate telecentric stop 30 may not be necessary. Alternatively, the LEDs 22 can simply be secured to stop 30 in a manner that supplies power to the LEDs.

The exemplary optical device 10 further includes a support structure 40 supporting a fixture 42 and a mirror 50 as schematically shown in section in FIGS. 1 and 2. Support structure 40 can be any object supporting surface in a typical machine vision system and can be stationary or moveable in any number of directions including rotatable about the optical axis 16. In a preferred example of the present invention, it is not necessary for support 40 to be moveable or rotatable.

Optical device 10 preferably includes a mirror 50 supported by support structure 40 as generally shown. In a preferred example, mirror 50 is a conical-shaped mirror having a first diameter opening 52 about optical axis 16 and an opposing second diameter opening 54 at mirror base 55 that is smaller than the first diameter opening 52. Base 55 and the first diameter opening 52 define a height 56 of mirror 50 along optical axis 16 as generally shown. In a preferred aspect, the first diameter opening 52 is within the field of view or vision (not shown) of the image taking device 14. Mirror 50 includes a reflective surface 58 angularly positioned between the first diameter opening 52 and the second diameter opening 54 as shown. Reflective surface 58 is a highly polished low defect surface suitable for the sensitivity of the inspection process or surface to be inspected. In one example, conical mirror 50 is made from aluminum that is diamond-turned to produce a substantially defect-free, highly reflective surface 58. Alternate materials may include electroless nickel coating and/or other materials and coatings known by those skilled in the art.

In a preferred example, where the object surface to be inspected is vertical and/or parallel to the optical axis 16, the angle of reflective surface 58 is positioned at a 45 degree angle with respect to the optical axis 16. It is understood that other angles of reflective surface 58 and geometries of mirror 50 may be used to suit the particular application and inspection requirements.

As shown in FIGS. 1 and 2, an exemplary three-dimensional object in the form of cylindrical-shaped object 60 is positioned on fixture 42 and upon support structure 40. Object 60 is preferably positioned in axial alignment with optical axis 16 with mirror 50 concentrically positioned 360 degrees about object 60. In one example, object 60 includes an inspection surface 70 parallel to the optical axis 16 and having a height 72. Object 60 further includes a first non-inspection surface 74 and a second non-inspection surface 80 separated along the optical axis 16. As shown, surfaces 70, 74 and 80 have different diameters about optical axis 16. Exemplary object 60 and surfaces 70, 74 and 80 extend 360 degrees around object 60 and optical axis 16. In one example, inspection surface 70 is a highly polished, substantially specular surface which is to be inspected by optical device 10 for surface continuity, surface defects and/or other markers or indicia. It is further understood that object 60 can take other prismatic forms or geometries than cylindrical object 60 as shown. In alternate examples where the geometric shape of object 60 and/or inspection surface 70 changes from the cylindrical example, mirror 50 and reflective surface 58 would also change such that illumination of the inspection surface 70 and/or object 60 would produce a planar image through transmission of the image rays 18 from object 60 to the image taking device 14. Similarly, fixture 42 may take other forms and geometries suitable for object 60 and the desired or imaging processes.

As illustrated in FIGS. 1 and 2, mirror 50 and more particularly, the height 56 of reflective surface 58, exceeds the height 72 of the object inspection surface 70 so as to capture an image of the entire height 72 of inspection surface 70 as more fully described below.

In operation, image capturing device 14 is positioned and activated as generally shown in FIGS. 1 and 2 and/or described above. Illumination source 20 is activated to produce illumination rays 24 through LEDs 22 in a direction toward telecentric field lens 26. Field lens 26 transforms the oblique principal illumination rays 24 to be substantially parallel to the optical axis 16 and perpendicular to support 40. Field lens 26 further directs the illumination rays 24 toward mirror 50 and exemplary cylindrical object 60.

On the image rays 18 and illumination rays 24 impinging on mirror reflective surface 58 substantially parallel to the optical axis 16, the conical-shaped mirror 50 redirects the image 18 and illumination rays 24 at a perpendicular angle to inspection surface 70 about all 360 degrees. The exemplary substantially specular inspection surface 70 reflects rays 18 and 24 of the full height 72 of inspection surface 70 back to reflective surface 58 at the same perpendicular direction with respect to inspection surface 70. The rays are directed by reflective surface 58 back where they came from through exemplary telecentric field lens 26 toward respective illumination source 20 and image taking device 14.

In an example of illumination in the form of narrow dark field illumination as generally shown in FIG. 2 and further described in commonly assigned U.S. Pat. No. 6,870,949, telecentric stop 30 includes a small aperture 34 preferably at the center along the optical axis 16. In this example, the returning illuminating rays 24 will be blocked by the telecentric stop 30 and not permitted to pass through rear lens group 28 to the image taking device 14. In this example using an illumination scheme shown in FIG. 2, inspection surface 70 will be imaged as substantially dark provided that no surface irregularities exist. In an instance of detected surface discontinuities, these will reflect principal illumination rays 24 at oblique angles, some of which will pass through telecentric stop aperture 34 and appear in the resultant image as a bright spot or area on the otherwise dark area of the optical image 90 discussed below. As discussed above, it is understood that other forms and/or positions of illumination, lenses and/or mirrors may be used in optical device 10 to suit the particular application known by those skilled in the art without deviating from the present invention.

Figure 3:
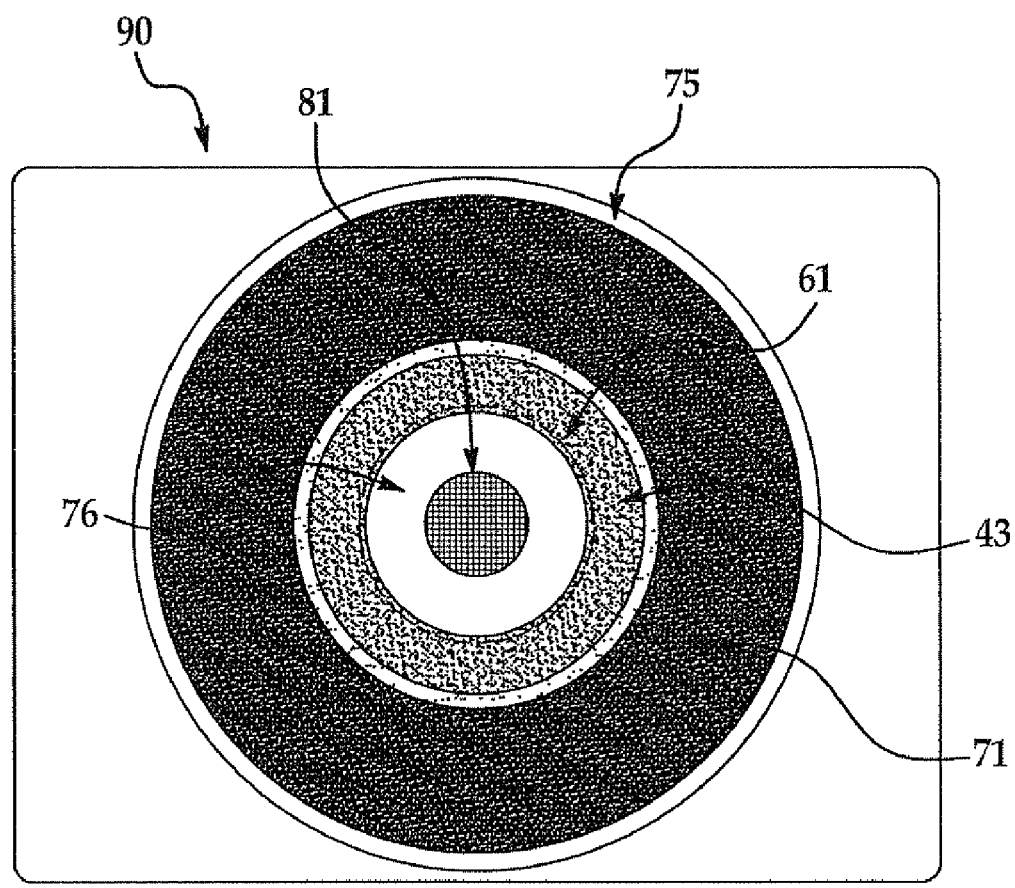
FIG. 3 is an enlarged schematic of an example of a planar image taken of the object in FIG. 1.

Referring to FIG. 3, an exemplary resultant two-dimensional, planar image of the three-dimensional object 60 shown in FIGS. 1 and 2 is illustrated. As described in FIGS. 1 and 2, FIG. 3 illustrates a planar image 90 of object 60 using narrow darkfield illumination. As shown, the aligned vertical surface of second non-inspection surface 80 simply shows as a circle 81. The first non-inspection surface 74 is shown as area 76 in planar image 90. The portion of first non-inspection surface 74 which is minimally covered by concentric reflective surface 58 near first diameter 52, appears as a bright area 75 toward the outer portion on image 90, in effect, through darkfield lighting. Whether this appears bright or dark is dependant on the characteristics (finish and angle) of surface 74. The non-important portion of the fixture 42 and support surface 40 that is within the field of view of the image taking device 14 appears, for example, as a relatively dark area 43 (moderately shaded for purposes of illustration only) with the edge of fixture 42 appearing as line or area 61 (shown as dashed line for purposes of illustration only). If the fixture 42 and support surface 40 portions were highly polished like inspection surface 70, these areas would appear as dark under the exemplary lighting. In other words, the particular surface treatment or processes used on fixture 42 and support surface 40 will dictate how these surfaces will appear in the optical image under the chosen illumination scheme.

The area 71 of image 90 represents a two dimensional, planar image of the three-dimensional cylindrical inspection surface 70 about 360 degrees. Under the narrow dark field illumination example of FIG. 2, this area 71 shown in FIG. 3 appears dark (shown as shaded almost completely black for illustrative purposes only) as the return illumination rays 24 reflecting off of surface 70 were substantially blocked by stop 30 leaving only a dark area visible by image taking device 14. Within the particular sensitivity of the optical device 10, a completely dark area would represent a suitable or defect-free surface. If localized bright spots were to appear, these would be areas that may include defects or other surface discontinuities, such as "soft" identification marks used on semiconductor wafers, known to those skilled in the art. It is understood that if other areas of object 60 were needed to be inspected, for example, second non-inspection surface 80, mirror 50 could be reconfigured and/or repositioned so reflective surface 58 directs the image and illumination rays to this surface instead of surface 70.

An advantageous feature of optical device 10 and resultant image 90 is that the planar image 90 of inspection surface 70 is a single image of the entire surface 70 about 360 degrees without having to rotate the image taking device 14 or the support 40 or fixture 42 supporting object 60. A further advantage is that the coplanarity and orthonormal relationship between the image rays 18 of telecentric lens 26 and a plane into which the cylindrical object 60 is optically mapped.

In one example of optical device 10, more than one form of illumination or lighting may be used other than, or in addition to, the described and illustrated narrow darkfield illumination. For example, traditional darkfield illumination and/or bright field illumination producing components may also be employed and successively used to produce different optical images 90 for a more thorough inspection process. For example, certain defects or object surface markers may not be identifiable using narrow darkfield illumination, but may be readily identifiable using brightfield illumination.

Figure 4:
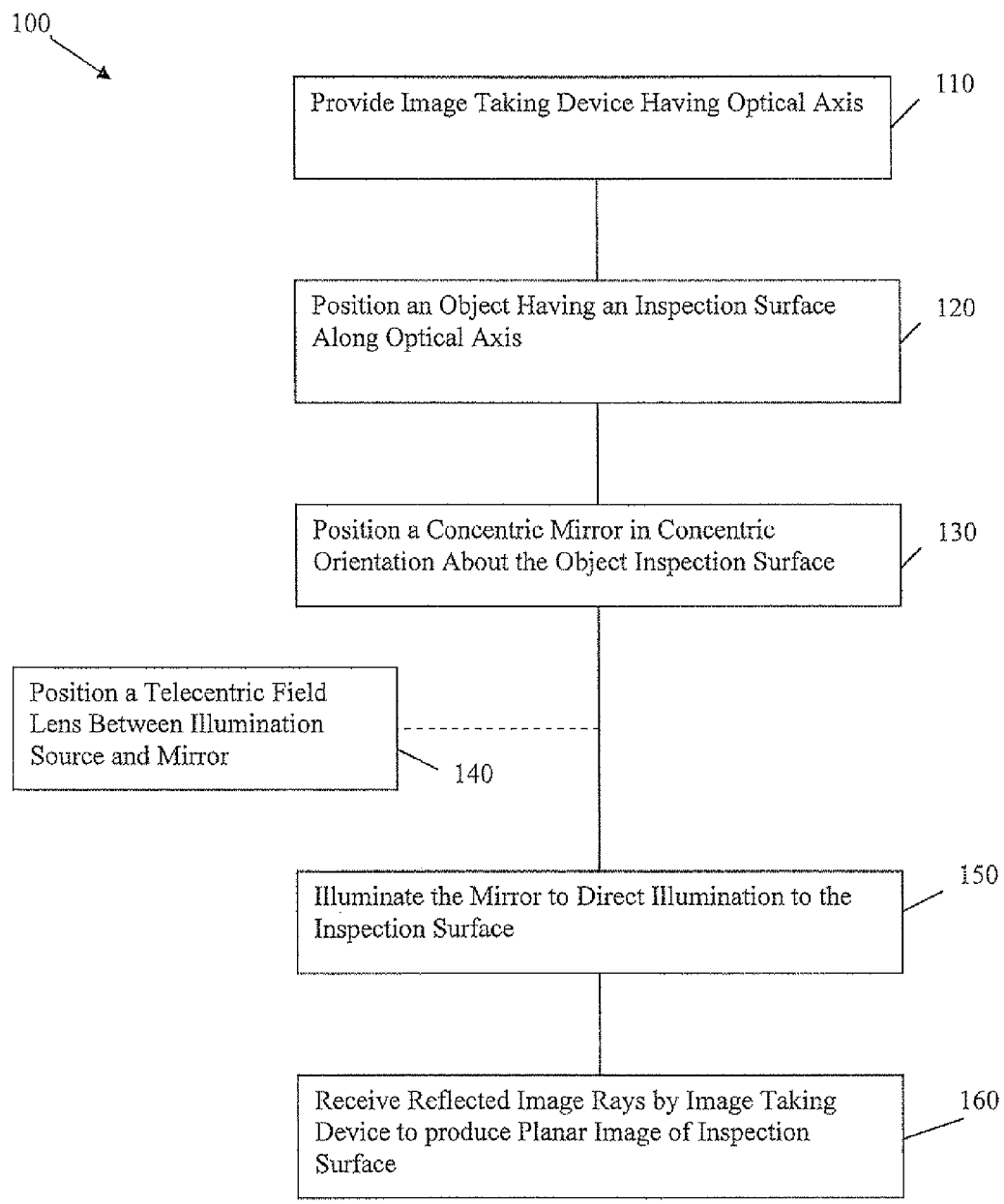
FIG. 4 is a flow chart of an example of the method of the present invention.

Referring to FIGS. 1-4, an exemplary method 100 for optically converting a three-dimensional surface into a two-dimensional planar image is illustrated. Referring to FIG. 4, in the first step 110, an image taking or capturing device 14 is provided and may be a CCD camera or other device as previously discussed. An object, for example a three-dimensional cylinder 60, is axially positioned along the optical axis upon a fixture 42 at step 120. A concentrically shaped mirror 50, shaped and oriented to be concentric with a desired inspection surface 70 of an object, in the example shown a cylindrical object 60, is positioned about optical axis 16 in step 130. A preferred but optional step 140 positions a telecentric field lens 26 and rear lens group 28 as generally described and illustrated above. An illumination source 20 is provided to illuminate the mirror 50 reflective surface 58 through use of an exemplary telecentric lens 26 as described above at step 150. In step 160, an image within the field of view of the image taking device 14 is captured resulting in a two-dimensional, planar image 90 of object 60, and in particular inspection surface 70, about 360 degrees without having to rotate the image taking device 14, support 40, fixture 42 or object 60. The resultant image portion 71 of inspection surface 70 may then be analyzed for defects, identification markings or other features of interest.

As described above, different forms of illumination other than narrow darkfield illumination as well as differently shaped and configured lenses and mirrors may be used to suit the particular application and sensitivity required to detect defects or other markers or indicia on the particular inspection surface of object 60 which itself could be other geometries than the described and illustrated cylindrical object.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An imaging device for use in optically transforming a surface of a three-dimensional object into a two-dimensional planar image, the image device comprising:

an image taking device for capturing two-dimensional optical images of a three-dimensional object positioned along an optical axis;

an illumination source for directing incident illumination rays toward the object; and a mirror concentrically shaped and positioned about the optical axis around the object and oriented to initially direct the incident illumination rays toward a concentric surface of the object to be inspected and to redirect reflected image rays from the object inspection surface back toward the image taking device.

2. The device of claim 1 further comprising a lens positioned between the illumination source and the conical mirror through which the incident illumination and reflected image rays pass.

3. The device of claim 2 wherein the lens is a telecentric field lens.

4. The device of claim 1 wherein the three-dimensional object is cylindrically shaped.

5. The device of claim 4 wherein the two-dimensional planar image comprises a 360° image of the object inspection surface.

6. The device of claim 4 wherein the concentric mirror is conical-shaped about the optical axis having a first diameter and an opposing second diameter smaller than the first diameter defining a height and a reflective surface of the mirror.

7. The device of claim 6 wherein the height of the mirror is at least as long as a height of the object inspection surface along the optical axis.

8. The device of claim 1 wherein the illumination source produces at least one of darkfield illumination and brightfield illumination of the object inspection surface with respect to the image taking device.

9. The device of claim 8 wherein the dark field illumination is narrow darkfield illumination.

10. A method for use in optically imaging a three-dimensional object surface into a two-dimensional planar image, the method comprising:

providing an image capturing device having an optical axis;

positioning a three-dimensional object along the optical axis, the object having an inspection surface;

positioning a concentrically-shaped mirror about the optical axis and concentrically around and directed toward the object inspection surface;

illuminating the mirror with illumination rays to direct the illumination rays toward the inspection surface;

receiving reflected inspection surface image rays from the mirror by the image capturing device; and generating a planar image of the received object inspection surface image rays.

11. The method of claim 10 wherein illuminating the mirror further comprises projecting the illumination rays substantially parallel to the optical axis on to the mirror.

12. The method of claim 11 further comprising:
positioning a telecentric lens along the optical axis.

13. The method of claim 10 wherein illuminating the mirror further comprises providing at least one of darkfield illumination and brightfield illumination.

14. The method of claim 13 further comprising:
selectively permitting the passage of the reflected image rays to the image capturing device.

15. The method of claim 13 wherein illuminating the mirror further comprises providing narrow darkfield illumination.

16. The method of claim 10 wherein the object includes a three-dimensional cylindrical shape and the object surface includes a height along the optical axis.

17. The method of claim 16 wherein the reflected inspection surface image rays comprise a 360° view of the object inspection surface.

18. The method of claim 16 wherein the mirror has height at least as long as the height of the object inspection surface.

19. The method of claim 10 further comprising:
analyzing the planar image for continuity deviations in the object inspection surface.

20. An imaging device for use in optically transforming an inspection surface of a three-dimensional object into a two-dimensional planar image, the image device comprising:

means for providing an image capturing device having an optical axis;

means for positioning a three-dimensional object along the optical axis, the object having an inspection surface;

means for positioning a concentrically-shaped mirror along the optical axis and concentrically around and directed toward the object inspection surface;

means for illuminating the mirror with illumination rays;

means for receiving reflected inspection surface image rays from the mirror by the image capturing device; and means for generating a planar image of the received object inspection surface image rays.

\* \* \* \* \*